UNITED STATES PATENT OFFICE.

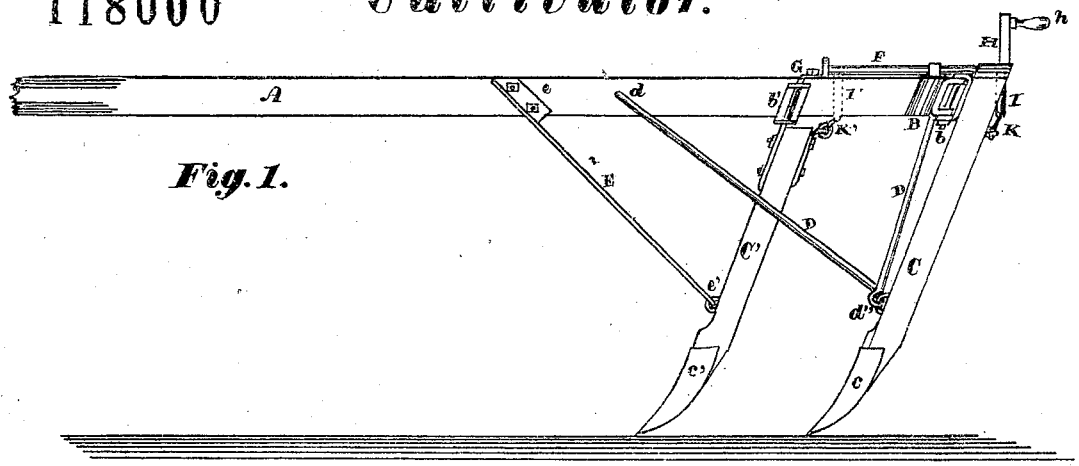
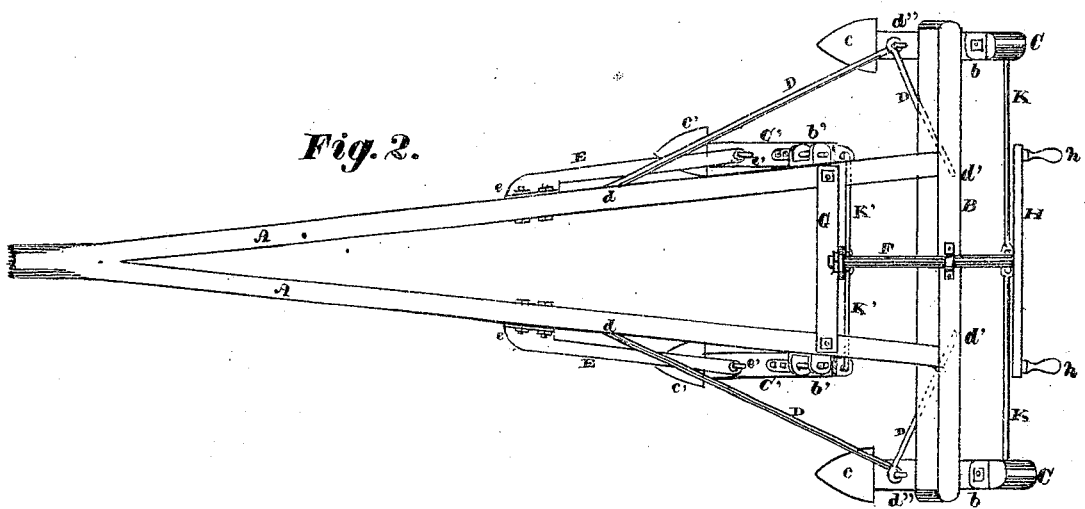
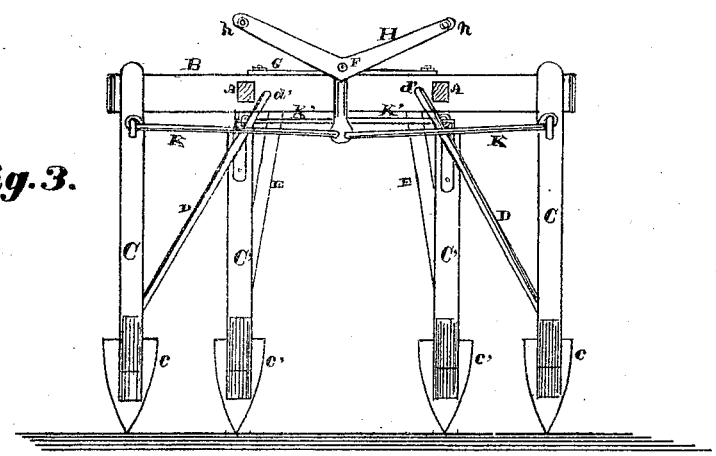

THOMAS J. ELLIS, OF DECATUR, ILLINOIS.

IMPROVEMENT IN CULTIVATORS.

Specification forming part of Letters Patent No. 118,000, dated August 15, 1871.

*To all whom it may concern:*

Be it known that I, THOMAS J. ELLIS, of Decatur, in the county of Macon and State of Illinois, have invented certain Improvements in Cultivators, of which the following is a specification:

My invention relates to an improvement in cultivators, the standards to which the shovels are attached being hinged and connected to the handles by rods so as to be easily turned, thereby giving a lateral motion to the pole or frame, and changing the direction of the machine without removing the shovels from the ground. The standards can also be hinged to the frame of riding cultivators and the handles so arranged as to be under the control of the driver by pressing on them with his feet.

Figure 1 is a side elevation of a machine embodying my invention. Fig. 2 is a plan of the same. Fig. 3 is a rear elevation of Fig 1.

A is the pole, which is forked and tenoned into the cross-piece B. C C C′ C′ are standards, to which the shovels c c c′ c′ are attached. The standards C C are hinged to the cross-piece B, as shown at b b. The standards C′ C′ are hinged to forks of the pole A, as shown at b′ b′. D D are braces, fastened to the pole at d d and to the cross-piece B at d′ d′. The braces pass through eyebolts on the standards C C, as shown at d″ d″, the brace forming a ring when it passes through the eyebolt and allows a side motion of the standards. E E are flat braces, fastened to the pole at e e and to eyebolts e′ e′ on the standards C′ C′, which allows a side motion of the standards, and the braces being flat prevent a lateral motion. F is a shaft, working in bearings on the cross-piece B and cross-piece G. To this shaft is attached a knee, H, provided with handles h h. I I′ are standards on the shaft F. These standards are provided with eyes. K K are rods connecting the standards C C to the standard I. K′ K′ are rods connecting the standards C′ C′ to the standard I′. The rods are connected to the standards with eyebolts.

To guide the plows the knee is depressed or raised by the handles, causing the shovels to turn, thereby changing the direction of the machine without raising the shovels from the ground.

This arrangement of the hinges, shaft, connecting-rods, &c., can be attached to a riding cultivator, so that the handles on the knee will be under the control of the driver by pressing on them with his feet.

I do not broadly claim the forked pole.

I claim as my invention—

The shaft F, knee H, handles h h, standards I I′, rods K K K′ K′, braces D D E E, and hinges b b b′ b′, in combination with the standards C C C′ C′ and forked pole A, substantially as and for the purpose hereinbefore set forth.

THOMAS J. ELLIS.

Witnesses:
   J. I. BEAR,
   C. P. HOUSUM.